(12) United States Patent
Escher et al.

(10) Patent No.: US 9,648,807 B2
(45) Date of Patent: May 16, 2017

(54) AGRICULTURAL HARVESTING MACHINE

(71) Applicant: CLAAS SELBSTFAHRENDE ERNTEMASCHINEN GMBH, Harsewinkel (DE)

(72) Inventors: Mathias Escher, Wallenhorst-Rulle (DE); Georg Eggenhaus, Saerbeck (DE); Thilo Krause, Glinde (DE); Boris Kettelhoit, Guetersloh (DE); Allan Kildeby, Espergaerde (DK); Jan Van De Sluis, Guetersloh (DE); Willi Behnke, Steinhagen (DE); Thomas Roewekamp, Wallenhorst (DE); Stephan Recknagel, Harsewinkel (DE)

(73) Assignee: CLAAS Selbstfahrende Erntemaschinen GmbH, Harsewinkel (DE)

( * ) Notice: Subject to any disclaimer, the term of this patent is extended or adjusted under 35 U.S.C. 154(b) by 380 days.

(21) Appl. No.: 14/324,516

(22) Filed: Jul. 7, 2014

(65) Prior Publication Data
US 2015/0009328 A1    Jan. 8, 2015

(30) Foreign Application Priority Data

Jul. 8, 2013    (DE) .................. 10 2013 107 169

(51) Int. Cl.
*H04N 7/18*    (2006.01)
*A01D 41/127*    (2006.01)
*A01D 75/00*    (2006.01)

(52) U.S. Cl.
CPC ....... *A01D 41/1273* (2013.01); *A01D 41/127* (2013.01); *A01D 75/00* (2013.01); *H04N 7/183* (2013.01)

(58) Field of Classification Search
CPC .. A01D 41/127; A01D 41/1273; A01D 75/00; H04N 7/183
(Continued)

(56) References Cited

U.S. PATENT DOCUMENTS 7,362,233 B2 *   4/2008   Behnke .............. A01D 41/1276
                                                        340/684
7,630,809 B2 *  12/2009   Behnke ................ A01D 41/127
                                                        56/10.2 R
(Continued)

FOREIGN PATENT DOCUMENTS

EP          1 763 988          3/2007

OTHER PUBLICATIONS

Laplante, Real-time imaging, Dec. 2004-Jan. 2005, IEEE Potentials, vol. 23, Issue:5, pp. 8-10.*

*Primary Examiner* — Francis G Geroleo
(74) *Attorney, Agent, or Firm* — Michael J. Striker

(57) ABSTRACT

An agricultural harvesting machine has a control arrangement including an optical sensor device for recording image series of a continuous main crop stream, an evaluation device for ascertaining a portion of damaged grain, a portion of non-grain in the main crop stream or both, on the basis of an image analysis of the recorded image series and a visualization device for displaying the portion of damaged grain and/or the portion of non-grain. The control arrangement cyclically records image series of the continuous main crop stream and, within a predetermined processing time after an image series has been recorded, displays a current portion of damaged grain, a current portion of non-grain or both, based on the image series.

22 Claims, 4 Drawing Sheets

(58) Field of Classification Search
USPC .......................................................... 348/148
See application file for complete search history.

(56) References Cited

U.S. PATENT DOCUMENTS

| | | | |
|---|---|---|---|
| 7,877,969 B2 | 2/2011 | Behnke | |
| 8,086,378 B2* | 12/2011 | Behnke | A01D 41/1277 348/120 |
| 8,161,718 B2* | 4/2012 | Bussmann | A01D 41/127 56/10.2 G |
| 2004/0186597 A1* | 9/2004 | Wippersteg | A01D 41/127 700/31 |
| 2005/0143153 A1* | 6/2005 | Behnke | A01F 12/52 460/4 |
| 2006/0007346 A1* | 1/2006 | Nakamura | H04N 5/2354 348/362 |
| 2006/0191251 A1* | 8/2006 | Pirro | A01D 43/085 56/60 |
| 2009/0125197 A1* | 5/2009 | Behnke | A01D 41/1277 701/50 |
| 2010/0125788 A1* | 5/2010 | Hieronymus | A01D 41/127 715/702 |
| 2010/0217481 A1* | 8/2010 | Baumgarten | A01D 41/127 701/33.4 |
| 2012/0004815 A1* | 1/2012 | Behnke | A01D 41/127 701/50 |
| 2013/0093908 A1* | 4/2013 | Numata | H04N 5/23209 348/220.1 |
| 2013/0332003 A1* | 12/2013 | Murray | A01D 41/127 701/1 |
| 2014/0050364 A1* | 2/2014 | Brueckner | G06K 9/34 382/110 |
| 2014/0078277 A1* | 3/2014 | Dai | A61B 1/00004 348/68 |

* cited by examiner

AGRICULTURAL HARVESTING MACHINE

CROSS-REFERENCE TO A RELATED APPLICATION

The invention described and claimed hereinbelow is also described in German Patent Application DE 10 2013 107169.4, filed on Jul. 8, 2013. The German Patent Application, the subject matters of which is incorporated herein by reference, provides the basis for a claim of priority of invention under 35 U.S.C. 119(a)-(d).

BACKGROUND OF THE INVENTION

The present invention relates to an agricultural harvesting machine having a control arrangement comprising an optical sensor device for recording image series of a continuous main crop stream, an evaluation device for ascertaining a portion of damaged grain and/or a portion of non-grain in the main crop stream on the basis of an image analysis of the recorded image series and a visualization device for displaying the portion of damaged grain and/or the portion of non-grain.

Agricultural harvesting machines and, in particular, self-propelled harvesting machines, which include combine harvesters and forage harvesters, for example, pick up crop from the field and process this crop using a series of working devices, preferably in a way that maximizes the yield of grain in the grain tank of the harvesting machine. These working devices are controllable, wherein the parameters thereof, in particular, i.e., the operating parameters of the working devices, can be adjusted, and wherein the setting of these parameters and the prevailing basic conditions result in a higher or lower quality of the harvested crop. In order to control the working devices and adjust the parameters thereof, modern harvesting machines regularly comprise control/regulating units, which can be operated by the driver from within the driver's cab. In the case of combine harvesters, these working devices include, for example, the threshing mechanism, which typically contains a concave and a plurality of threshing parts and, disposed downstream of the threshing mechanism in the direction of motion of the crop stream, a cleaning unit having a fan and a plurality of sieves.

Depending on the type of crop to be harvested, e.g. rapeseed, wheat, or barley, and what the prevailing basic conditions are on the field and in the surroundings thereof (for example, moisture, stand height, soil condition, etc.), a different control and parameter setting of the working devices may be required in order to obtain the highest possible quality of crop and, simultaneously, the highest possible yield. Large portions of broken grains and contaminants in the crop, for example, are unwanted.

It is known from the prior art, such as EP 1 763 988 A1, to provide a camera on a harvesting machine to record series of images of the crop stream in the crop conveyance path, which are then analyzed in terms of the quality of the crop that is depicted. The quality is defined primarily by the portion of damaged grain and non-grain. The parameter settings of the working devices, on the basis of which the series of images are created, are compared to one another. This makes it easier to select a suitable parameter setting. The assessment of the quality of the crop stream on the basis of the image series and the subsequent selection of the parameter setting may be implemented automatically or by an operator on the basis of his own comparison.

The disadvantage of this solution is that an image series showing the crop for a certain parameter setting of the working devices does not become available until after a relatively long start-up phase of the harvesting machine and the working devices. The image series is recorded only after the mechanical adjustment of the working devices according to a new parameter setting has been completed and after other start-up processes that can induce a deviation from the quasi-stationary state of the crop stream have subsided. The result thereof is that, first, an evaluable representation is made available to the operator or the corresponding automatic function typically only after a period of several minutes, which can vary, and, therefore, only then can an assessment be made as to whether and which effect a certain parameter setting has on the crop quality. Secondly, local irregularities such as a surface in the crop field that is contaminated locally, although to a particularly great extent, either do not show up at all in the analysis or corrupt the result to such an extent that these local circumstances are assumed to apply for the entire field or are at least partially projected. In both cases it then becomes difficult to identify the actual circumstances.

SUMMARY OF THE INVENTION

The present invention overcomes the shortcomings of known arts, such as those mentioned above.

To that end, the present invention provides an agricultural harvesting machine with a control arrangement such that the effect of changes in the parameter settings of the working devices are more accurately and rapidly estimated and local irregularities in a crop field are better identified, thereby making it possible to more rapidly and accurately respond thereto.

In an embodiment, the invention provides an agricultural harvesting machine with a control arrangement including an optical sensor device for recording image series of a continuous main crop stream, an evaluation device for ascertaining a portion of damaged grain and/or a portion of non-grain in the main crop stream on the basis of an image analysis of the recorded image series and a visualization device for displaying the portion of damaged grain and/or the portion of non-grain.

In the machine so characterized, the continuous crop stream is a continuous main crop stream and the control arrangement cyclically records image series of the continuous main crop stream and, within a predetermined processing time after an image series has been recorded, displays a current portion of damaged grain and/or a current portion of non-grain based on the image series. The portion of damaged grain and/or the portion of non-grain is extrapolated to a throughput of the main crop stream by relating a measured surface area-portion of damaged grain and/or a measured surface-area portion of non-grain of at least one image in the image series to a volume portion of damaged grain and/or a volume portion of non-grain by means of a respective correction factor, in particular by a respective crop-dependent correction factor, preferably in that the current portion of damaged grain and/or the current portion of non-grain, in particular the current volume portion of damaged grain and/or the current volume portion of non-grain, are displayed as a percentage.

Recording image series in a cyclical manner and subsequently displaying, in real time, a corresponding portion of damaged grain and/or a portion of non-grain in this image series provides the operator with useful information regarding the crop quality and the quality of the parameter setting of the working devices and the field conditions even in the absence of a started-up state. Even if the analytical result displayed as portion of damaged grain and/or a portion of non-grain does not always make it possible to perform a quantitatively accurate estimation in the transition states, it is possible to subsequently perform a qualitative rapid assessment and, therefore, respond more quickly, either automatically or by the operator.

Preferably, different portions of damaged grain and/or portions of non-grain are implemented in the display to the operator and in a regulation of the parameter setting of the working devices.

It also is preferable that the current portion of damaged grain and/or the current portion of non-grain are displayed based on the image series to the operator in an impactful manner and for warning the operator, in particular, when the current portion of damaged grain and/or the current portion of non-grain enter a critical range or when a permissible range has been exited.

The invention may also include a sensor device the operation of which ensures that a portion of damaged grain and/or a portion of non-grain based on an image series are displayed as soon as possible after said image series has been recorded.

For that matter, the mechanical design of the sensor device and, the sensor positioning at a conveyor for the crop stream ensure that the dynamic crop stream is reliably and comprehensively recorded in order to provide (that is, realize) the most accurate information possible on the crop that is currently being processed.

BRIEF DESCRIPTION OF THE DRAWINGS

Further features and advantages of the invention will become apparent from the description of embodiments that follows, with reference to the attached figures, wherein.

DETAILED DESCRIPTION OF THE PREFERRED EMBODIMENTS

The following is a detailed description of example embodiments of the invention depicted in the accompanying drawings. The example embodiments are presented in such detail as to clearly communicate the invention and are designed to make such embodiments obvious to a person of ordinary skill in the art. However, the amount of detail offered is not intended to limit the anticipated variations of embodiments; on the contrary, the intention is to cover all modifications, equivalents, and alternatives falling within the spirit and scope of the present invention, as defined by the appended claims.

Figure 1:
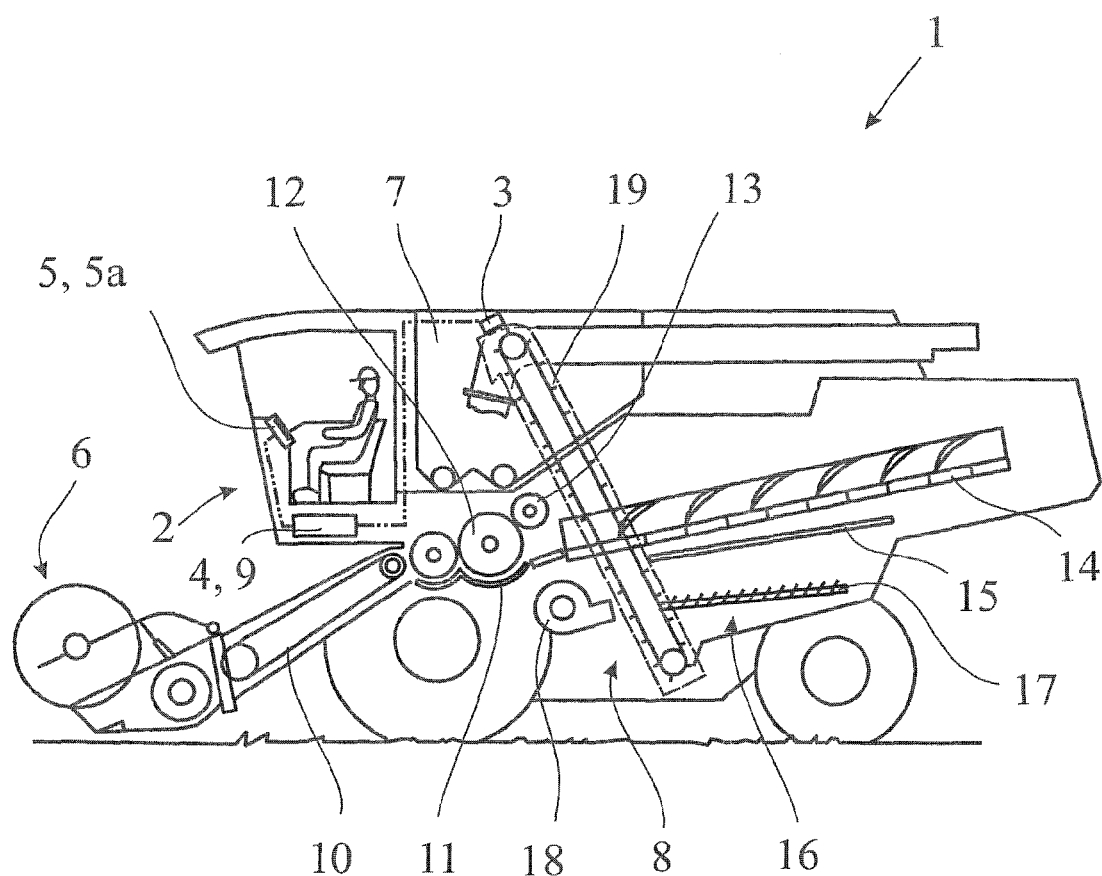
FIG. 1 depicts a schematic side view of a combine harvester constructed according to the invention.

The agricultural harvesting machine shown in FIG. 1 comprises a combine harvester 1 with a control arrangement 2. This control arrangement 2 comprises an optical sensor device 3 for recording image series of a continuous main crop stream and an evaluation device 4 for ascertaining a portion of damaged grain and/or a portion of non-grain in the main crop stream on the basis of a recorded image series and a visualization device 5 for displaying the portion of damaged grain and/or the portion of non-grain.

The evaluation device 4 and the visualization device 5, in particular, may be separate or designed as a single device. An image series in this sense comprises any series of individual images recorded in succession in short intervals, wherein such an image series can also comprise one single image. In an embodiment, each image series comprises a constant number of images.

In an embodiment, one or more images from an image series is selected for further evaluation and the remaining images are discarded. The time interval between the individual images of an image series is defined as the between-image time, wherein the total recording period of the image series is referred to as the image series recording period. The between-image time can be constant or, preferably, variable. For example, the between-image time can be adjusted by the evaluation device 4. A video also can be recorded, from which one or more individual freeze frames is selected, which freeze frames then form an image series. In such a case, the between-image time results in a similar manner from the time delay between the individual images.

The individual images of the image series can have different image parameters, for example, a different angular perspective, exposure time, image recording period, spectrum of the illuminating light, etc. The individual images also can have been recorded by a distributed sensor device 3 comprising a plurality of individual sensor devices, wherein these images, which were recorded from different perspectives, are joined together to form a single image series.

In this case, the term the "crop stream" of the harvesting machine is intended to mean the stream of processed crop on the crop conveyance path of the harvesting machine. The crop conveyance path begins, in the case of the combine harvester 1, in particular, with the header 6 and extends at least to the grain tank 7 of the combine harvester 1. The term "main crop stream" refers to that portion of the crop stream that forms the main part of the harvested crop relative to the entire crop conveyance path. In other words, "main crop stream" does not refer to a (partial) crop stream that moves through a smaller lateral junction of the crop conveyance path that may be present, in the form of a bypass.

The terms "portion of damaged grain" and "portion of non-grain", respectively, refer to the portion of damaged grains relative to all grains in the crop stream and the portion of material in the crop stream that is not grain in the sense of the crop. Therefore, material also can flow into the non-grain portion that is indeed grain but is not grain of the crop currently being harvested. This portion of damaged grain or non-grain can relate to the image surface currently detected by the corresponding image series or to a certain partial volume of the crop stream that has just been detected. Preferably, however, the portion of damaged grain and/or the portion of non-grain is relative to a throughput of the main crop stream, that is, to the totality of the main crop stream that is conveyed through the harvesting machine and the combine harvester in particular.

The portion of damaged grain and/or the portion of non-grain that is determined can be based on a single image in the image series, on the entire image series or on a special selection of one or more images in the image series. One or more images are selected from the image series that are the best images according to a quality criterium. Such a quality criterium is a particularly suitable distribution of brightness, contour, or contrast. The evaluation device 4 basically performs an image analysis of the image series or a portion of the image series, in which damaged grain and non-grain are detected, preferably initially, in the image with the aid of suitable algorithms. The surface area occupied by the damaged grains and non-grains on the two-dimensional image is then calculated as the area ratio, and this area ratio is extrapolated to a portion of the volume with the aid of a suitable extrapolation function.

In addition to the display of the portion of damaged grain and/or the portion of non-grain, an acoustic signal may be generated, via the output of a warning signal, for example, when the portion of damaged grain and/or the portion of non-grain falls below or exceeds a limit value.

In one harvesting machine embodiment, the control arrangement 2 cyclically records image series and, within a predetermined processing time after an image series has been recorded, displays a current portion of damaged grain and/or a current portion of non-grain based on the image series. The cyclicity therefore relates to the image series, wherein the point in time when the first image in the image series is recorded, for example, is defined as the decisive point in time for the determination of the cyclicity.

The above-defined image series recording period also can be the same as the cycle time of the image series, which corresponds to a quasi-continuous recording of images without a noticeable pause between individual image series. It also should be noted that every image series that is actually recorded need not result in the display of a current portion of damaged grain or current portion of non-grain based on the image series within a predetermined processing time. For example, images or image series also may be recorded that are discarded even before being fed to the evaluation device 4. It is only necessary for there to be not only image series that are discarded in this manner, but also further recorded image series that were recorded in a cyclical manner and in the case of which a current portion of damaged grain and/or a current portion of non-grain based on the image series is displayed within the predetermined processing time after these have been recorded.

A cyclic recording of the image series in this case is intended to mean that the recording of the image series is constantly repeated but does not necessarily occur within a constant period. The image series may be cyclically recorded, in particular, by the evaluation device 4 controlling the sensor device 3.

The display of a current portion of damaged grain and/or a current portion of non-grain based on the image series within a predetermined processing time after the image series is recorded may be understood as a real-time condition or a real-time requirement. A processing time is therefore determined in advance, within which a portion of damaged grain and/or a portion of non-grain is always displayed after an image series is recorded, subject to the above-described option to discard individual image series. This displayed portion of damaged grain and/or portion of non-grain is based on the image series that was recorded. In other words, the maximum time between these two events, basically the transit time between the recording of an image series and the display of a portion of damaged grain and/or a portion of non-grain based thereon, is defined as the processing time. Within the processing time, the information in the recorded image series is reflected in the current portion of damaged grain and/or the current portion of non-grain that is displayed. In the event that a portion of damaged grain and/or a portion of non-grain based on the image series is displayed for every image series that is recorded, which is preferred, the displayed portion of damaged grain and/or portion of non-grain is cyclically updated in the same manner in which the image series is recorded.

It should be noted that a current portion of damaged grain and/or a current portion of non-grain that is based on the recorded image series but is not necessarily determined only on the basis thereof is displayed within the predetermined processing time. It is possible, for example, as described more clearly below, to implement averaging, in which case the current portion of damaged grain and/or the current portion of non-grain is based on a dynamic window of image series. In such a case, the only requirement is that, after the image series is recorded and within the predetermined processing time, the corresponding image series is already in this dynamic window and thereby flows into the determination of the portion of damaged grain and/or the portion of non-grain. The fact that further previously recorded image series also flows through such a representation in windows does not limit this determination.

In this case and in the following, the concept of the current portion of damaged grain or the current portion of non-grain is intended to mean the special value for the portion of damaged grain or the portion of non-grain that is currently displayed.

In an embodiment, the harvesting machine according to the invention comprises controllable working devices 8 and the control arrangement 2 comprises a control/regulating unit 9 for adjusting the parameters of the working devices 8 on the basis of the current portion of damaged grain and/or the current portion of non-grain. As shown in FIG. 1, the control/regulating unit 9 is disposed in the same device as the evaluation device 4.

In the combine harvester 1 as shown, the controllable working devices 8 include the previously mentioned header 6 and the feed rake 10 connected thereto. The crop stream of the combine harvester 1 is transferred from this feed rake to the threshing parts 12 enclosed by the concave 11. By way of a guide drum 13, the crop stream enters the separating device 14, which is embodied as a separating rotor in this case, in which freely moving grains of the crop stream are separated into a lower region. From here, the crop stream reaches a cleaning unit 16 by way of the return pan 15, wherein this cleaning unit comprises a plurality of sieve levels 17 and a fan 18, as depicted here. From here, the grain elevator 19 ultimately conveys the crop stream to the grain tank 7.

The aforementioned working devices 8 are controlled and, in particular, implement parameter settings. The relationship between the parameter setting of the working devices 8 and the quality of the crop is complex and depends on the type of crop and on a plurality of further basic conditions. It is pointed out, for example, that, in the event the threshing parts 12 are operated too intensively, grains in the crop incur excessive damage and more energy is consumed in the threshing process. On the other hand, an inadequate threshing intensity of the threshing parts 12 can result in a lower volume of threshed crop and, therefore, a lower yield.

In the case of the cleaning unit 16 as well, the parameter setting must be implemented such that all grains in the crop, if possible, are conveyed further in the crop conveyance path, but contaminants and other unwanted components are separated out. Even under known basic conditions, it is a challenge to implement the optimal parameter setting of the working devices 8. The embodiment described makes it possible for the control/regulating unit 9 of the control arrangement 2 to automatically or semi-automatically control the working devices 8 and adjust the parameters thereof.

Figure 3:
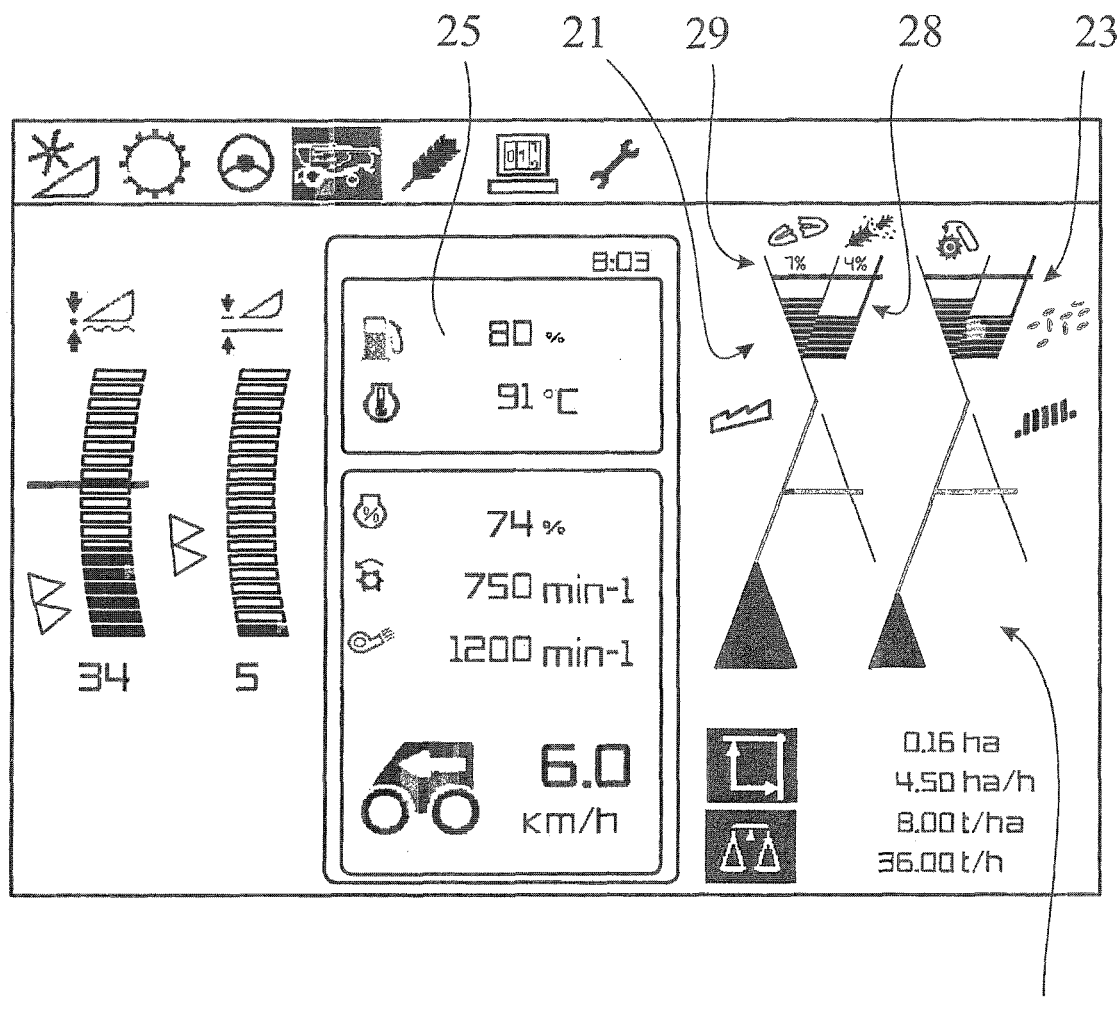
FIG. 3 depicts a first example of a screen shot of a user interface of the combine harvester of FIG. 1 to highlight a funnel diagram.
Figure 4:
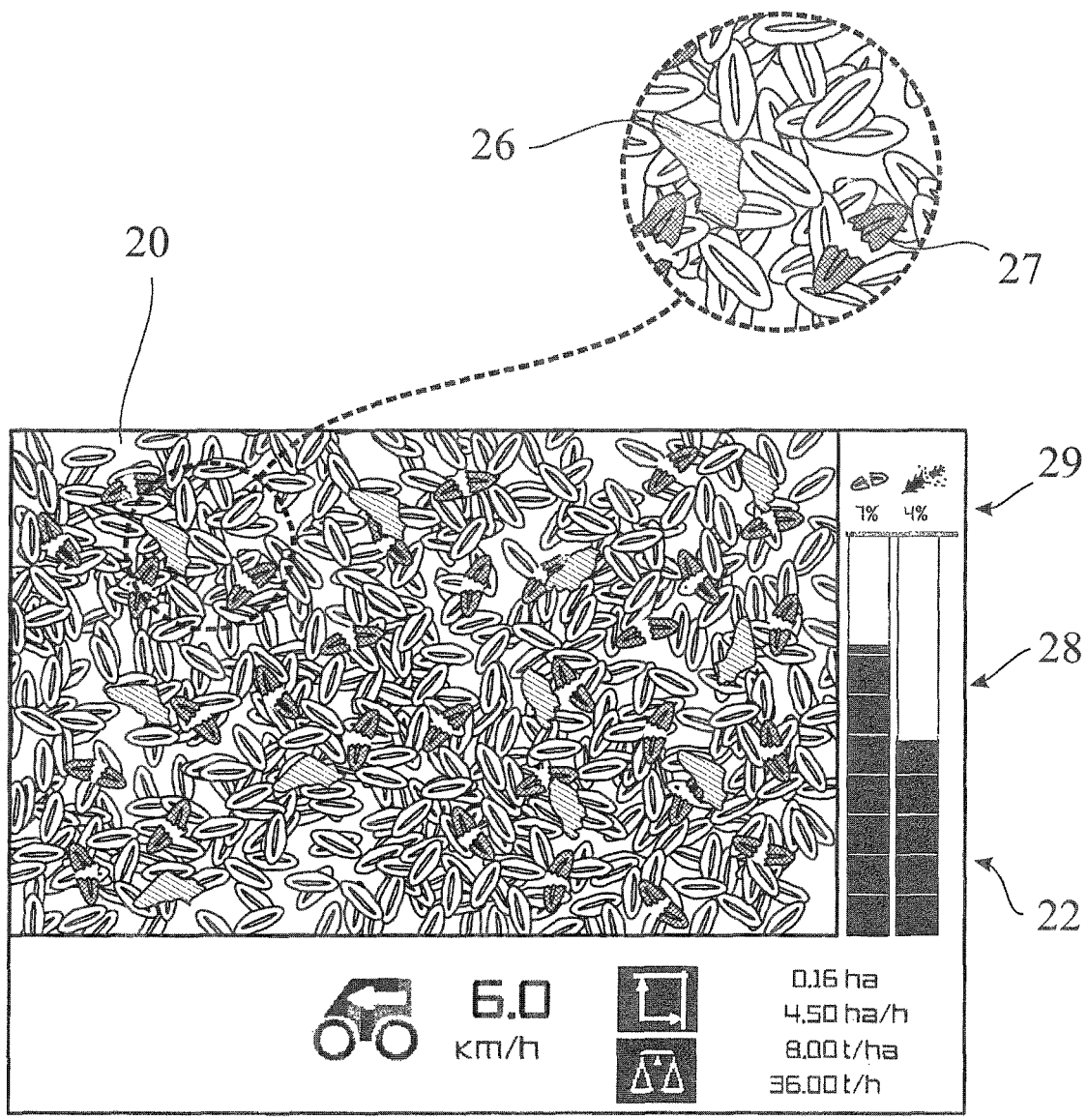
FIG. 4 depicts a further example of a screen shot of the user interface of the combine harvester to highlight the crop stream and a vertical bar chart.

Furthermore, the evaluation unit 4 preferably determines a raw portion of damaged grain and/or a raw portion of non-grain and an averaged portion of user damaged grain and/or an averaged portion of user non-grain. The raw portion of damaged grain and/or the raw portion of non-grain is either not averaged over time or at least has less of an averaging, over time, in particular, than the averaged operator portion of damaged grain and/or the averaged operator portion of non-grain. The visualization device 5 displays the operator portion of damaged grain and/or the operator portion of non-grain. Examples of this are depicted in FIGS. 3 and 4, as described in greater detail further below. In order to ensure that the operator will not become confused by abrupt changes in the display, the current operator portion of damaged grain and/or the current operator portion of non-grain that is displayed to the operator has been subjected to at least a moderate form of averaging.

Building upon this, the control/regulating unit 9 may also adjust the parameters of the working devices 8 on the basis of the current raw portion of damaged grain and/or the current raw portion of non-grain. In principle, the automatic regulation is then capable of responding more rapidly than the visualization device 5 can output a display to the operator.

The portion of damaged grain and/or the portion of non-grain is preferably extrapolated to a throughput of the main crop stream by relating a measured surface area-portion of damaged grain and/or a measured surface-area portion of non-grain of at least one image in the image series to a volume portion of damaged grain and/or a volume portion of non-grain by means of a respective correction factor. A different correction factor is used to determine the portion of damaged grain and the portion of non-grain. Such a correction factor, which make take a form of a function of the surface area-portion of damaged grain and/or the surface-area portion of non-grain, accounts for the situation in which the percentage of surface area covered by damaged grain or non-grain in an image does not necessarily correspond to the percentage of volume occupied by damaged grain or non-grain in the main crop stream. In this case, the correction factor for the portion of damaged grain is upon the surface-area portion of damaged grain as well as on the surface-area portion of non-grain. Likewise, the correction factor for the portion of non-grain can be dependent on the surface-area portion of non-grain as well as on the surface-area portion of damaged grain.

The aforementioned correction factor, which is crop-dependent in particular, is preferably empirically determined, i.e., by taking measurements, and is stored in the evaluation unit 4. In order to determine the volume portion of damaged grain or the volume portion of non-grain, the surface-area portion of damaged grain or the surface-area portion of non-grain is multiplied by the applicable correction factor. The extrapolation to the throughput of the main crop stream is based on the volume of the entirety of the main crop stream that is conveyed through the harvesting machine and, in particular, the combine harvester 1. In this case and in the following, the term "portion of damaged grain" and the term "portion of non-grain" preferably refer to the aforementioned volume portion of damaged grain and the volume portion of non-grain, respectively, and therefore the respective terms have the same meaning. Similarly, the current portion of damaged grain and/or the current portion of non-grain, in particular the current volume portion of damaged grain and/or the current portion of non-grain, are displayed as a percentage.

In an option for displaying the current portion of damaged grain and/or the current portion of non-grain, the visualization device 5 displays a video image 20, which is a video freeze frame in particular and which corresponds to an image in the recorded image series. An example of such a display of a video image 20 on a visualization device 5, which can also be a touch screen 5*a*, is shown in FIG. 4.

In this case, non-grain components 26 and damaged grain 27 also are visually emphasized, for example, using colored contours or shading. Non-grain components 26 are shown in green and damaged grain 27 is shown in red, for example. This makes it easier for the operator to perform an additional evaluation and estimation of the portion of damaged grain and/or the portion of non-grain. Provided the display frequency is sufficiently high, the video image 20 can also appear as a moving image.

In terms of the display, the visualization device 5 further preferably displays a funnel diagram 21 and/or a vertical bar chart 22. The funnel diagram 21 and/or the vertical bar chart 22 represent the current portion of damaged grain and/or the current portion of non-grain. The funnel diagram 21 and/or the vertical bar chart can each comprise, in particular, a representation of a percentage relative to the totality of the main crop stream in particular.

FIG. 3 shows a further example of a display of the aforementioned visualization device 5. The funnel diagram 21 that is displayed represents the current portion of damaged grain and the current portion of non-grain. The tailings volume 23, the loss due to cleaning 24, and the hotkey window 25 also are represented.

FIG. 4 shows the aforementioned video image 20 as well as a corresponding vertical bar chart 22 for the current portion of damaged grain and for the current portion of non-grain.

Preferably, the funnel diagram 21 and/or the vertical bar chart 22 further display a permissible range 28, as shown both FIGS. 3 and 4. The permissible range 28 in each case is the region under the bar (as shown). This enables the operator to determine, at a glance, whether the corresponding portion of damaged grain and/or portion of non-grain are located within or outside of a desired permissible range 28.

Proceeding therefrom, the visualization device 5 further preferably outputs a warning signal, preferably visually as well as acoustically, when the current portion of damaged grain and/or the current portion of non-grain are located in a warning range 29. This warning also can occur when the current portion of damaged grain and/or the current portion of non-grain are outside the permissible range 28. In this manner it is possible for the operator to be additionally notified when the current portion of damaged grain and/or the current portion of non-grain leave the permissible range 28 or reach the warning range 29.

As mentioned above, the portion of damaged grain and/or the portion of non-grain are based on the recorded image series, which was recorded by the sensor device 3. The sensor device 3 described in the following and the arrangement thereof in the harvesting machine have significance as a separate invention.

In this regard, it is preferred that the sensor device 3 (FIG. 2) comprises a light detector 30, for example, a CMOS (complementary metal-oxide-semiconductor) light sensor 30*a*, and an illuminating device 31, which is preferably a light-emitting diode arrangement 31*a*.

In order to remain within the processing time, the invention provides for the light detector 30 to comprise a global shutter for adjusting a light intake period. A global shutter is intended to mean the electronic capability to substantially simultaneously switch all individual pixels of the light detector 30 light-sensitive or light-insensitive. This capability is the opposite of a so-called rolling shutter, in which such a switch does not occur simultaneously for all individual pixels, but rather merely successively in series.

It has also proven advantageous to record all the images in any one image series using an identical light intake period. In other words, the opening time of the shutter, which corresponds to the time of the light sensitivity of the light detector 30, is the same for all images in any one image series. This has the advantage that a time-consuming switchover of the light intake period of the light detector 30 can be omitted and, therefore, the image-recording timing can be increased. Preferably, the light intake period also can be the same for the recorded image series.

The illuminating device 31 preferably generates a luminescent pulse for each image in an image series. The luminescent pulses of an image series may display (each) a different luminescent pulse duration. In other words, each image in an image series differs in terms of a different duration of the corresponding luminescent pulse. Since various features of the crop stream are interesting depending on the portion of damaged grain or the portion of non-grain to be determined, wherein this can differ from crop to crop and these features appear with differing clarity depending on the luminescent pulse duration, this variability of the luminescent pulse duration ensures that different features can be ascertained.

Figure 2:
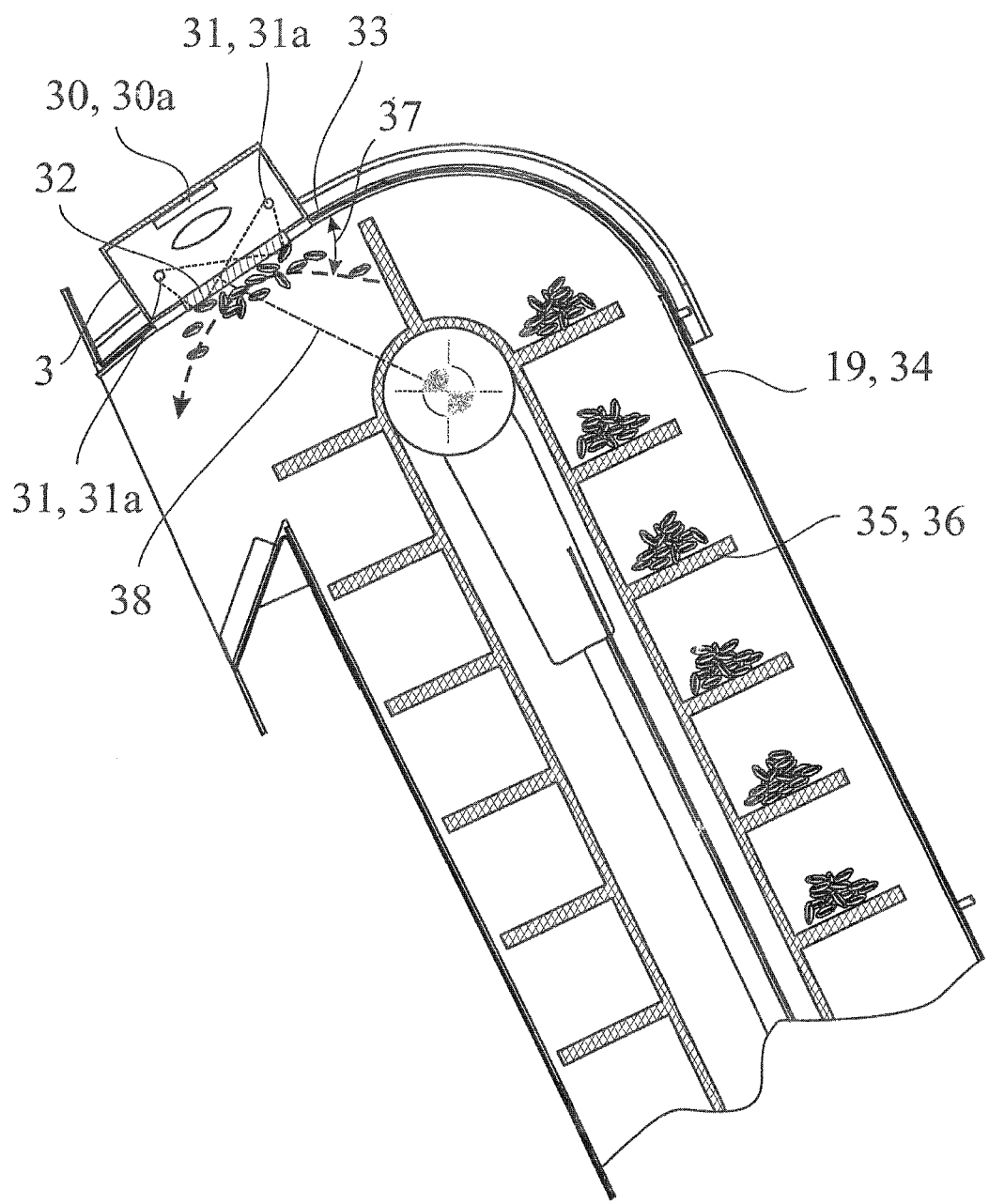
FIG. 2 depicts a schematic side view of a grain elevator of the combine harvester shown in FIG. 1.

In addition to the internal configuration of the sensor device 3, there also are preferred arrangements and configurations of the sensor device 3 within the harvesting machine. For example, as shown in FIG. 2, the sensor device 3 comprises a transparent housing piece 32, which is part of a wall surface 33, which is locally flat, in particular, of a preferably tubular crop conveyor 34. The crop conveyor 34 can be the grain elevator 19 in particular. In other words, the transparent housing piece 32, which allows passage of the luminescent pulses and permits reflection thereof, is part of the wall of the crop conveyor 34 and is offset neither toward the front nor toward the back relative to this wall. Such an arrangement has the advantage that the sensor device 3 can not only be disposed particularly close to the crop stream and the presence thereof has minimal influence on the conveyance of the crop stream on the crop conveyance path, but also that the components of the crop stream bring about the cleaning thereof on their own by impacting the transparent housing piece 32. Dust generation is thereby effectively prevented.

The crop conveyor 34 preferably comprises a crop drive arrangement 35, preferably crop paddles 36, which move the main crop stream such that this main crop stream is at least partially deflected onto the transparent housing piece 32. If it is hereby ensured that crop in the main crop stream is substantially always in the direct vicinity of the transparent housing piece 32 or the crop touches said housing piece, the sensor device 3 can always be focused on a fixed distance, preferably on a point substantially directly on the other side of the transparent housing piece 32 and it is ensured that the main crop stream can still be detected at this focused distance.

In an embodiment, the main crop stream is deflected, at least in part, onto the transparent housing piece 32 at an acute angle 37, which is therefore less than 45° and, in particular, less than 22.5°. An example of an acute angle 37 is shown in FIG. 2. In this manner it is ensured that, in the event that the main crop stream impacts the housing piece 32, this main crop stream is not substantially deflected from the normal course thereof and that a defined relative motion between the main crop stream and the housing piece 32 takes place.

Alternatively, the main crop stream is deflected, at least in part, onto the transparent housing piece 32 at an obtuse angle, which is preferably greater than 67.5°. It is thereby effectively ensured that the main crop stream at least partially touches the transparent housing piece 32 and that this takes place in such a way that ensures particularly good cleaning of the transparent housing piece.

In order to best ensure that the result of the determination of the portion of damaged grain and/or the portion of non-grain is unadulterated, wherein this adulteration could occur, for example, when only one part of the crop stream would be provided, via a junction, for pick up by the sensor device 3, the wall surface 33 formed by the transparent housing piece 32 preferably forms a section of a crop conveyor cross-section 38 through which substantially the entire crop stream of the harvesting machine passes. In other words, substantially the entire crop stream of the harvesting machine must pass through the crop conveyor cross-section 38, which is basically detectable by the sensor device 3 and can therefore be included in the image series.

Ideally, the provision of the sensor device 3 and the evaluation device 4, and the functionality thereof, do not slow down the conveyance of the crop stream on the crop conveyance path. It is therefore preferable for the continuous main crop stream to be conveyed past the transparent housing piece 32 in a substantially constantly moving manner. The previously mentioned cleaning effect is thereby also additionally promoted.

Referring back to the originally mentioned real-time reaction of the control arrangement 2, the predetermined processing time preferably amounts to substantially one second, and preferably less than one second. In other words, after an image series has been recorded, the control arrangement 2 displays a portion of damaged grain and/or a portion of non-grain based on this image series within a period of time not to exceed one second. This time, on an individual basis, can also be less than one second.

This predetermined processing time need not always be the same, however. This variant is characterized in that the harvesting machine is designed to selectively harvest a plurality of crop types and the control arrangement 2 determines the predetermined processing time from a set of predetermined processing times based on the selected crop type. This variability depending on the crop type need not be limited to the predetermined processing time, but rather can also influence the time period within which the image series is recorded. In that case, the image series is preferably recorded within an image recording period that is based on the selected crop type.

The cycle time with which the sensor device 3 cyclically records the image series is basically not strictly interrelated with the predetermined processing time. As described above, however, the current portion of damaged grain and/or the current portion of non-grain that are displayed can basically be "refreshed" that much more rapidly the more frequently image series are recorded. It is therefore preferable for the control arrangement 2 to cyclically refresh the current portion of damaged grain that is displayed and/or the current portion of non-grain that is displayed and, in fact, with a display cycle time, i.e., a cycle time of the display process, which is substantially equal to the cycle time with which the sensor device 3 cyclically records the image series. The sensor device 3 preferably records image series with a maximum cycle time, wherein this maximum cycle time is less than the predetermined processing time.

The sensor device 3 also can record the image series periodically, and therefore the sensor device 3 preferably records image series with a period time and, in turn, this period time is preferably less than the predetermined processing time. The result is that the control arrangement 2 periodically refreshes the current portion of damaged grain and/or the current portion of non-grain that is displayed and, in fact, with a periodic, and, therefore, constant, output cycle time, which is substantially equal to the cycle time with which the sensor device 3 cyclically records the image series.

As will be evident to persons skilled in the art, the foregoing detailed description and figures are presented as examples of the invention, and that variations are contemplated that do not depart from the fair scope of the teachings and descriptions set forth in this disclosure. The foregoing is not intended to limit what has been invented, except to the extent that the following claims so limit that.

What is claimed is:

1. An agricultural harvesting machine including a control arrangement comprising an optical sensor device for recording image series of a continuous main crop stream, an evaluation device for ascertaining a portion of damaged grain, a portion of non-grain in the main crop stream or both, based on an image analysis of the recorded image series and a visualization device for displaying the portion of damaged grain and/or the portion of non-grain,
    wherein the control arrangement cyclically records the image series of the continuous main crop stream and, within a predetermined processing time after the image series has been recorded, displays a current portion of damaged grain, a current portion of non-grain or both, based on the image series,
    wherein the portion of damaged grain, the portion of non-grain or both, is extrapolated to a throughput of the continuous main crop stream by relating a measured surface area-portion of damaged grain, a measured surface-area portion of non-grain or both, of at least one image in the image series to a volume portion of damaged grain, a volume portion of non-grain or both, by use of a crop-dependent correction factor.

2. The agricultural harvesting machine of claim 1, wherein the crop-dependent correction factor is a current portion of damaged grain, a current portion of non-grain or both, displayed as a percentage.

3. The agricultural harvesting machine according to claim 1, further including controllable working devices, wherein the control arrangement further comprises a control/regulating unit for adjusting parameters of the controllable working devices based on the current portion of damaged grain, the current portion of non-grain or both.

4. The agricultural harvesting machine according to claim 1, wherein the evaluation device determines a raw portion of damaged grain, a raw portion of non-grain and an averaged operator portion of damaged grain, an averaged operator portion of non-grain or combinations thereof, wherein the visualization device displays an operator portion of damaged grain, the operator portion of non-grain or both and wherein the control/regulating unit adjusts the parameters of the controllable working devices based on the current raw portion of damaged grain, the current raw portion of non-grain or both.

5. The agricultural harvesting machine according to claim 1, wherein the visualization device displays a video image in a form of a video freeze frame that corresponds to an image in the recorded image series.

6. The agricultural harvesting machine according to claim 1, wherein the visualization device displays a funnel diagram, a vertical bar chart or both, wherein the funnel diagram, the vertical bar chart or both, represent the current portion of damaged grain, the current portion of non-grain or both.

7. The agricultural harvesting machine according to claim 6, wherein the visualization device outputs a warning signal when the current portion of damaged grain, the current portion of non-grain or both, are located in a warning range.

8. The agricultural harvesting machine according to claim 6, wherein the visualization device additionally outputs a warning signal when the current portion of damaged grain, the current portion of non-grain or both, are located outside a permissible range.

9. The agricultural harvesting machine according to claim 1, wherein a funnel diagram, a vertical bar chart or both display a permissible range.

10. The agricultural harvesting machine according to claim 1, wherein a sensor device comprises a light detector and an illuminating device.

11. The agricultural harvesting machine according to claim 10, wherein the sensor device comprises a complementary metal oxide semiconductor (CMOS) light sensor.

12. The agricultural harvesting machine according to claim 11, wherein the CMOS light sensor comprises a global shutter for adjusting a light intake period and wherein the images of a single image series are recorded with an identical light intake period.

13. The agricultural harvesting machine according to claim 10, wherein the illuminating device is a light-emitting diode arrangement.

14. The agricultural harvesting machine according to claim 10, wherein the illuminating device generates a luminescent pulse for each image in an image series and wherein the luminescent pulses of the image series each have a different luminescent pulse duration.

15. The agricultural harvesting machine according to claim 1, wherein a sensor device comprises a transparent housing piece that is part of a flat wall surface of a tubular crop conveyor.

16. The agricultural harvesting machine according to claim 15, wherein the transparent housing piece forms a section of a crop conveyor cross-section, through which substantially the entire continuous main crop stream of the harvesting machine passes.

17. The agricultural harvesting machine according to claim 15, wherein the crop conveyor comprises a crop drive arrangement.

18. The agricultural harvesting machine according to claim 17, wherein the crop drive arrangement comprises crop paddles that move the continuous main crop stream such that the continuous main crop stream is at least partially deflected onto the transparent housing piece at an acute angle or at an obtuse angle.

19. The agricultural harvesting machine according to claim 18, wherein the continuous main crop stream is conveyed past the transparent housing piece in a substantially constantly moving manner.

20. The agricultural harvesting machine according to claim 1, wherein the predetermined processing time amounts to substantially one second or less.

21. The agricultural harvesting machine according to claim 1, wherein the harvesting machine is set up to selectively harvest a plurality of crop types and the control arrangement determines the predetermined processing time from a set of predetermined processing times based on a selected fruit type.

22. The agricultural harvesting machine according to claim 1, wherein a sensor device records image series with a maximum cycle time or a period time and wherein the maximum cycle time or the period time is less than the predetermined processing time.

* * * * *